Dec. 11, 1973 W. K. FAIRCHILD 3,778,327
FLEXIBLE TUBING MANUFACTURING MACHINE
Filed March 5, 1971
5 Sheets-Sheet 1

Wayne K. Fairchild,
INVENTOR.
BY.

R Sadler

ATTORNEY

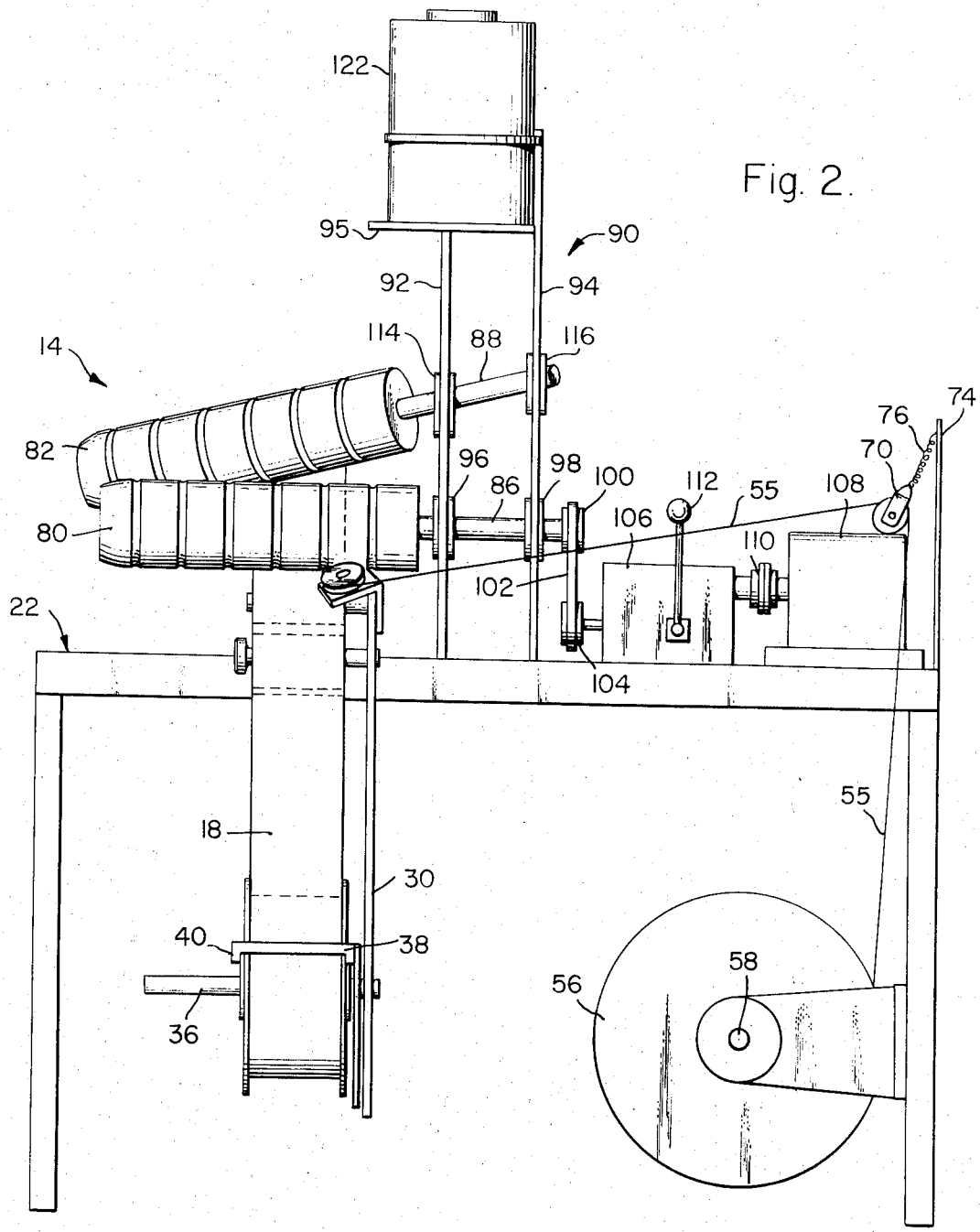

Dec. 11, 1973   W. K. FAIRCHILD   3,778,327
FLEXIBLE TUBING MANUFACTURING MACHINE
Filed March 5, 1971   5 Sheets-Sheet 3
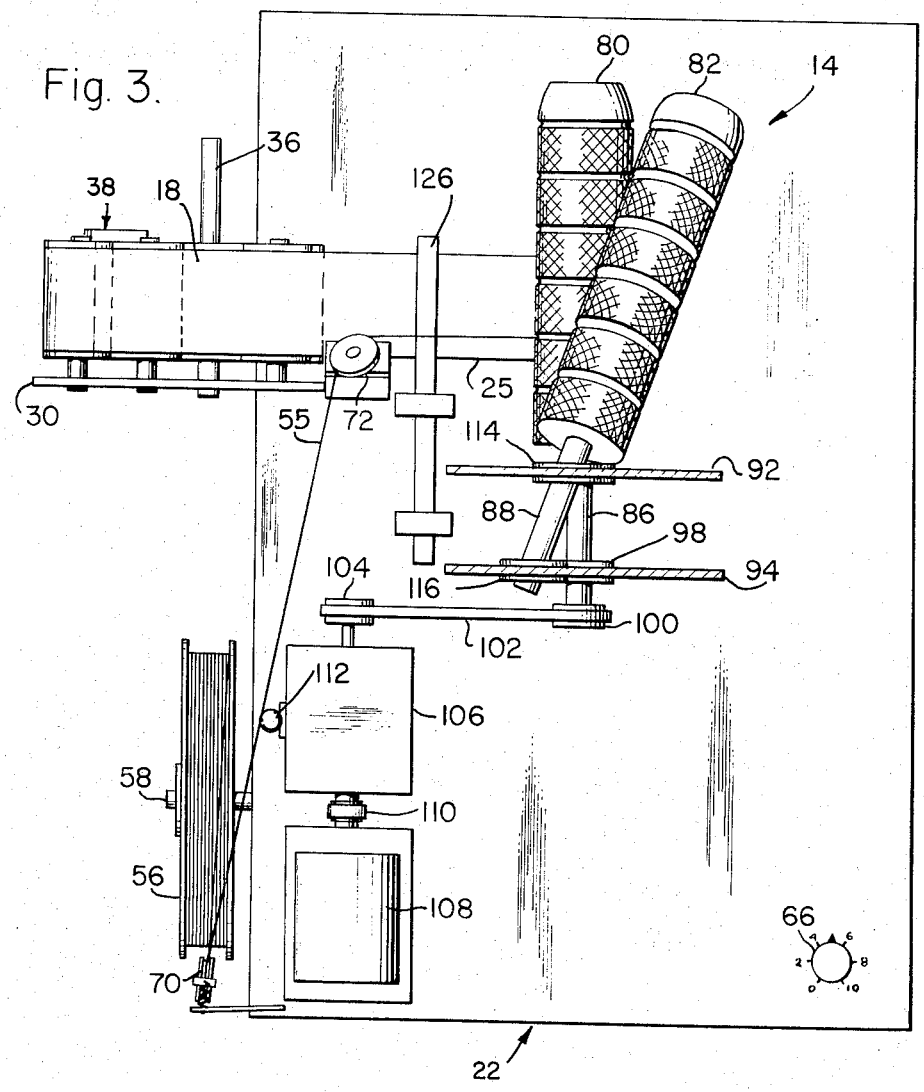
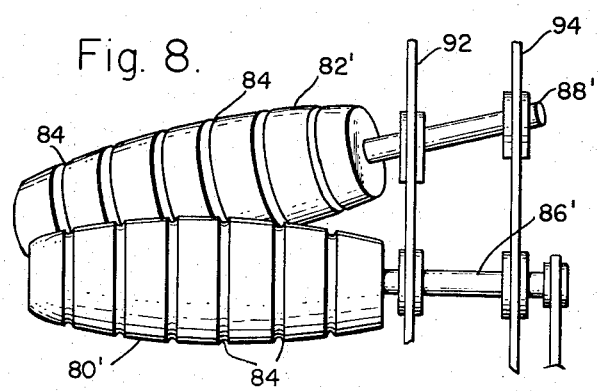
Wayne K. Fairchild,
INVENTOR.
BY.
ATTORNEY.

Dec. 11, 1973 W. K. FAIRCHILD 3,778,327
FLEXIBLE TUBING MANUFACTURING MACHINE
Filed March 5, 1971 5 Sheets-Sheet 4

Wayne K. Fairchild,
INVENTOR.
BY.

R Sadler

ATTORNEY.

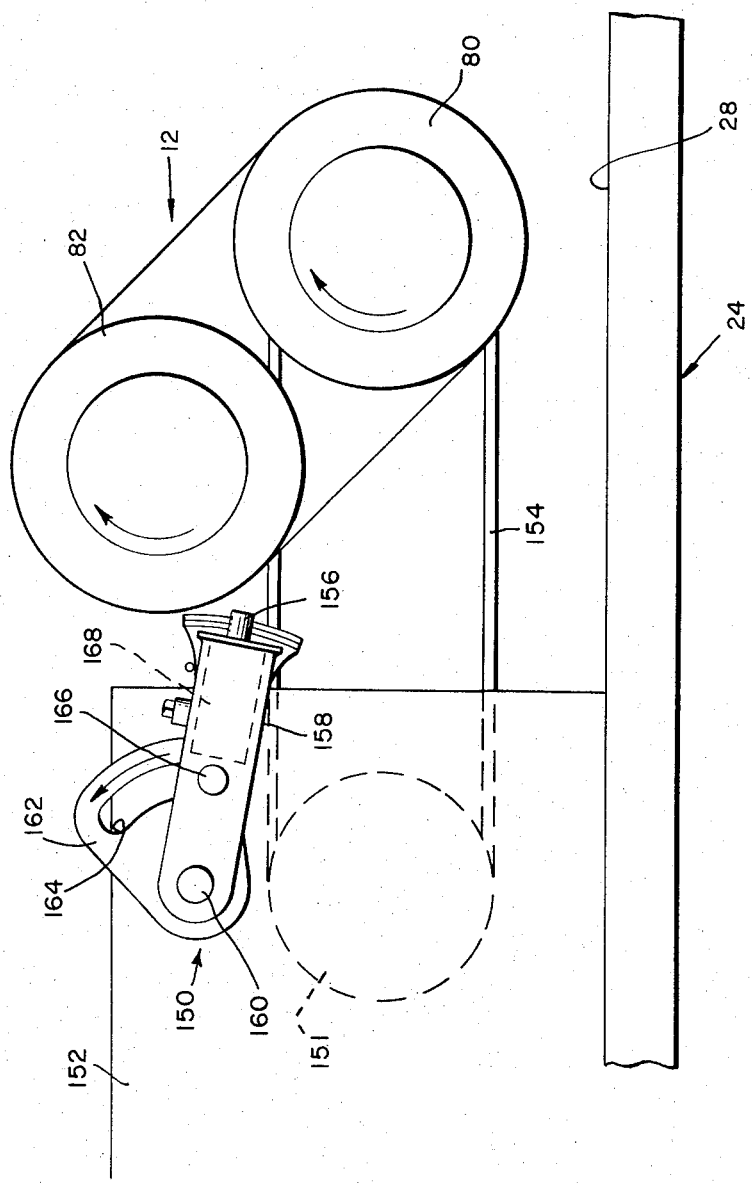

United States Patent Office 3,778,327
Patented Dec. 11, 1973

3,778,327
FLEXIBLE TUBING MANUFACTURING MACHINE
Wayne K. Fairchild, Santa Ana, Calif., assignor to Automation Industries, Inc., Century City, Los Angeles, Calif.
Filed Mar. 5, 1971, Ser. No. 121,419
Int. Cl. B31c 3/00
U.S. Cl. 156—425   7 Claims

ABSTRACT OF THE DISCLOSURE

A machine is disclosed herein which is particularly adapted for continuously making an indefinite length of flexible ducting. The machine includes a mandrel upon which an indefinite length of a tape or strip of flexible material and an indefinite length of a flexible spiral spring are wound and bonded together to form the duct. The mandrel includes a pair of cylindrical rollers which are rotatably positioned adjacent each other with their axes skew. As the strips of flexible material and spring are continuously wrapped around the rollers and bonded together, they advance axially along the rollers whereby a flexible duct is continuously produced.

BACKGROUND

Heretofore, various means have been provided for continuously producing flexible ducting in endless lengths. For example, U.S. Pat. No. 3,271,064 entitled Method and Apparatus for Making Indefinite Length Flexible Conduit and U.S. Pat. No. 3,155,559 entitled Method and Apparatus for Forming and Continuously Advancing a Helically Wound Mandrel Surface filed in the name of Marcus A. Hall. Both of said patents are assigned of record to Automation Industries, Inc., and disclose and claim machines which are very effective to produce flexible ducting at extremely high rates of speed with very little or no manual handling, etc. However, machines of this nature are fairly expensive and therefore require a substantial capital investment. Although they are capable of producing virtually any type of flexible ducting, they are most suitable for producing high-quality ducting of a complex nature.

SUMMARY

The present invention provides a simple, low-cost machine for continuously producing flexible ducting. The machine is particularly adapted for efficiently producing simple, low-cost flexible ducting such as is commonly used for such installations as laundry dryer vents, etc. The machine includes a mandrel upon which the materials are wrapped to form the duct. The mandrel includes a pair of substantially cylindrical rollers which are rotatably mounted adjacent each other. The axes of the rollers are skew to each other. The distance around the outside of the two rollers is substantially equal to the inside circumference of the duct.

An indefinite length of a strip or tape of flexible material and a spring are wrapped onto the two rollers at an oblique angle to the axes of at least one of the rollers. The adjacent edges of the successive turns of the strip or tape overlap each other and are bonded together to form the duct. The skewness of the rollers and the obliqueness of the strip cause the duct to gradually work its way axially down the mandrel as it is formed.

DRAWINGS

Figure 1:
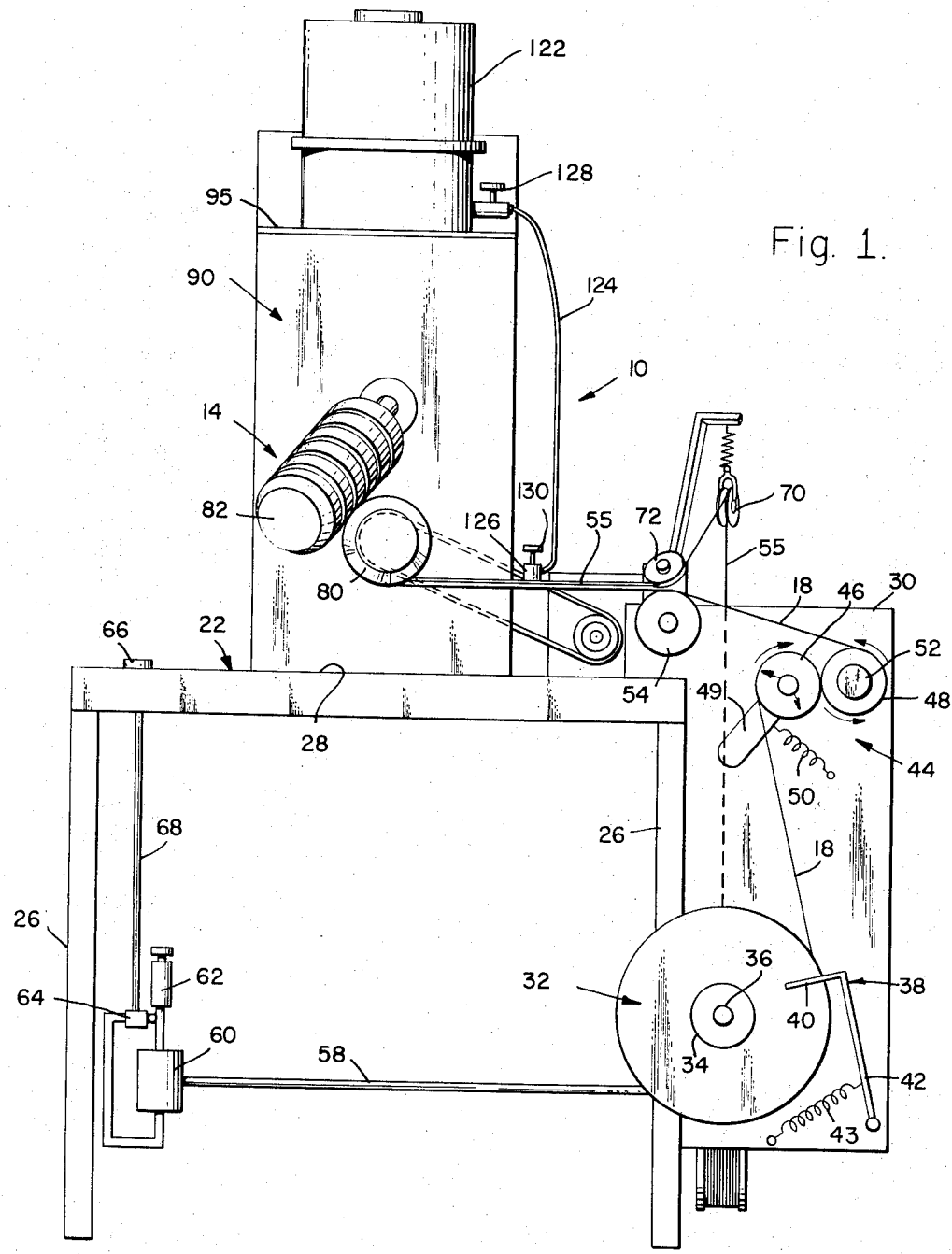
Figure 4:
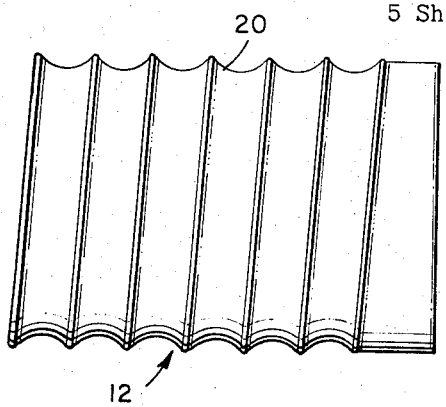
Figure 6:
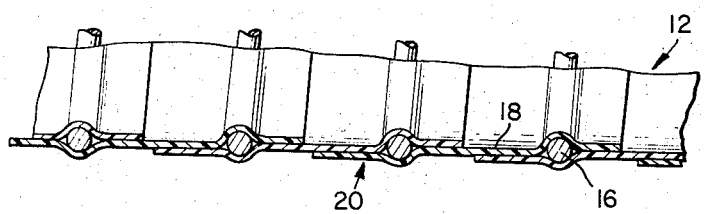
Figure 5:
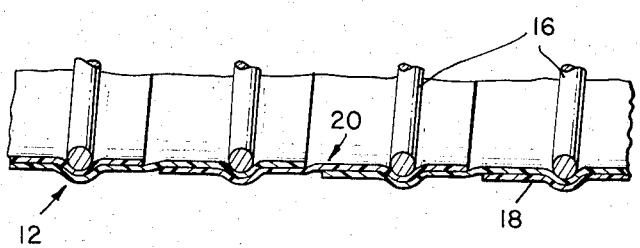
Figure 7:
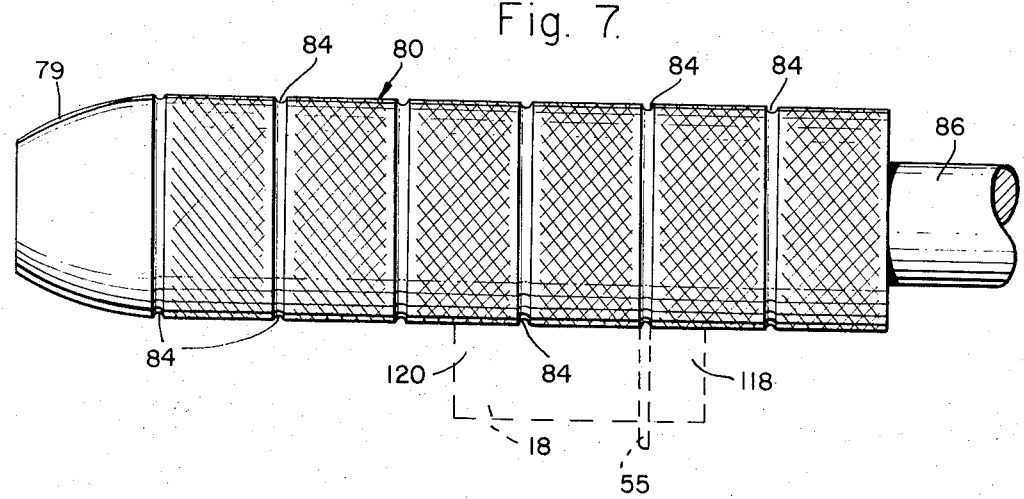

FIG. 1 is an end view of a machine embodying the present invention particularly adapted for producing a flexible duct;
FIG. 2 is a side view of the machine of FIG. 1;
FIG. 3 is a plan view of the machine of FIG. 1;
FIG. 4 is a side view of a section of duct as produced on the machine of FIGS. 1, 2 and 3;
FIG. 5 is a fragmentary, longitudinal, cross-sectional view (on an enlarged scale) of a portion of the duct of FIG. 4;
FIG. 6 is a fragmentary, cross-sectional view similar to FIG. 5 but showing a duct embodying a modified form of construction of the duct;
FIG. 7 is a side view of one of the rollers in the mandrel embodied in the machine;
FIG. 8 is a view of a mandrel embodying a modified form of roller; and
FIG. 9 is an end view of a marker for use on the machine to mark the finished duct.

DESCRIPTION

Referring to the drawings in more detail, the present invention is particularly adapted to be embodied in a machine 10 for making a flexible duct 12. The machine 10 includes a moving mandrel 14 upon which the components of the duct 12 are wound and upon which the duct 12 is formed.

The duct 12 may be of a wide variety of constructions. However, it is usually formed by continuously wrapping one or more of the components in a spiral to form an endless length of duct 12. By way of example, the duct 12 produced on the machine 10 may be similar to that shown in FIG. 4.

This duct 12 is of the flexible variety and is formed by spirally wrapping the various components into a substantially cylindrical shape. The duct 12 includes a spiral spring 16 and a strip or tape 18 of a flexible material. The tape 18 may be of any suitable material such as vinyl plastic, an open mesh scrim cloth, etc.

The spiral spring 16 is usually of a relatively weak nature. It may be easily expanded or compressed axially and/or bent around an arc without permanently deforming the spring 16 from its free or natural shape. Since the spring 16 in effect forms a support or backbone for the duct 12, it would not be too easily crushable in a radial direction. However, under some circumstances it is desirable for the duct 12 to be easily deformed out of its true cylindrical shape. For example, it may be desirable for the duct 12 to pass through an irregular shaped opening and/or be attached to a fitting which is not truly circular.

The spiral spring 16 has a natural pitch (i.e., when it is free to assume its natural shape) which insures a space of some predetermined dimensions between the adjacent turns.

The strip or tape 18 of material is wrapped around and supported by this spring 16 as may be seen in FIG. 5. The strip 18 has a width which is on the order of about double the spacing between the adjacent turns of the spring 16. This insures the strip 18 extending across and overlaying two adjacent turns of the spring 16 whereby the opposite edges of the strip 18 extend substantially halfway between the adjacent turns of the spring 16. Where the edges overlap they are bonded together.

When the duct 12 is being formed upon the present machine 10 and when it is fully extended, the wall of the duct 12 will be substantially flat and cylindrical. However, when the duct 12 is released whereby the spring 16 may contract axially and assume its normal or natural shape, the portions of the wall 20 between the adjacent turns of the spring 16 tend to fold or sag radially inwardly. This provides a corrugated configuration similar to that shown in FIG. 4.

The machine 10 is normally mounted upon a suitable structure such as a table 22 having a substantially horizontal top 24 and a plurality of vertical legs 26.
The top of the table 22 forms a flat work surface 28 disposed at substantially the same height as the operator's waist. A support or mounting bracket such as a plate 30 may be mounted on the side of the table 22 in a substantially vertical position.

The tape or strip 18 of material forming the wall 20 of the duct normally comes in very long lengths and is supplied on a spool or reel 32. Usually, the spool 32 includes a relatively small hub 34 upon which the strip 18 is wound. The hub 34 of the spool 32 is mounted on a spindle 36 projecting horizontally from the side of the plate 30. As the tape 18 is being used it is pulled off the spool 32 and the spool 32 rotates on the spindle 36.

With some types of tape materials there are no side walls, etc., to retain the spool 32 in a true disc shape. As a consequence, the outside radius of the spool 32 may tend to vary as the tape 18 is unwound. Also the tape 18 frequently tends to slide laterally, etc., whereby the spool 32 is not a true disc. As a consequence, the outer periphery of the spool 32 tends to wobble or otherwise run eccentrically as it rotates on the spindle 36 while the tape 18 unwinds.

In order to prevent misalignment, etc., of the tape 18 as it is being unwound, it has been found desirable for the hub 34 to be mounted upon the spindle 36 to allow it to "float" axially upon the spindle 36 while it is rotating.

In addition, a guide 38 is provided for leading the tape 18 from the spool 32. This guide 38 includes a fork 40 mounted on the end of a swinging arm 42. The arm 42 is supported upon a pin projecting from the plate 30 whereby the arm 42 is free to swing in an arc substantially parallel to the support 30. However, the arm 42 is not free to move toward or away from the support 30.

The fork 40 on the end of the arm 42 includes a pair of extensions or fingers which straddle the spool 32 and extend along both sides thereof. A spring 44 is provided for retaining the fork 40 on the spool 32 at approximately the same point the tape 18 leaves the spool 32.

As the tape 18 unwinds and the diameter of the spool 32 decreases, the fork 40 will swing inwardly and remain against the spool 32. The fork 40 cannot move normal to the plane of the spool 32. Since the fingers fit snugly against both sides of the spool 32, the point from which the tape 18 unrolls will always be retained a constant, fixed distance from the support plate 30. Since the hub 34 is free to "float" upon the spindle 36, if the spool 32 is warped, etc., as the spool 32 wobbles, all of the irregular motion will be absorbed by the hub 34 moving axially along the spindle 36.

As a consequence, it may be seen the tape 18 will always begin its journey through the machine 10 from a point that is a fixed or constant distance from the support plate 30.

Control means 44 are also provided for guiding the tape 18 and regulating the tension therein. This includes a pair of rollers 46 and 48 which are mounted upon the plate 30 with their axes parallel and horizontal.

The first roller 46 is mounted on a swinging arm 49 carried by the plate or support 30. Although this arm 49 allows the roller 46 to travel along an arcuate path, a spring 50 biases the roller 46 so that it tends to ride against the second roller 48. The second roller 48 is mounted in a fixed position upon the support plate 30. Although this roller 48 is free to rotate, a friction brake is provided. By tightening or loosening the knob 52 adjacent the roller 48, a preselected, constant drag can be imposed upon the roller 48.

As may be best seen in FIG. 1, when the tape 18 leaves the spool 32 at the fork 40 it passes over the top of the first roller 46 in a clockwise direction and then under the second roller 48 in a counterclockwise direction. Since the swinging arm 49 insures the tape 18 being compressed between the two rollers 46 and 48, it imposes a certain amount of drag and tension in the tape 18.

This insures the tape 18 being maintained in tight, intimate, non-slipping engagement with the second roller 48.

Since the friction brake resists turning of the second roller 48 as the tape 18 is pulled into the machine 10, a selected tension will be maintained in the tape 18 after it leaves the second roller 48.

In addition, a third roller 54 or guide may be mounted on the plate support 30. The primary purpose of this roller 54 is to assist in leading the tape 18 from the tensioning roller 48 onto the mandrel 14. In the present instance the tape 18 merely travels over the top of this third roller 54. This roller 54 is free to rotate without producing any particular drag on the tape 18.

The spiral spring 16 which forms the reinforcement for the duct 12 may be of any desired material. For example, it may be fabricated from a metallic wire of soft steel, spring steel, etc. However, it is usually formed from a material such as a plastic wire. Accordingly, whenever used herein the term wire shall mean a long, slender member of any type of material.

In any event the wire 55 is normally supplied on a reel 56 which contains a large amount of the wire. The reel 56 is adapted to be rotatably mounted alongside the table 22. In this embodiment the reel 56 is secured on the end of the shaft 58 which extends across the table 22 whereby the reel 56 is disposed in a vertical plane alongside the table 22. The reel 56 is normally locked onto the shaft 58 by a key, etc., whereby the shaft 58 rotates with the reel 56.

An oil pump 60 such as a positive displacement gear pump is connected to the shaft 58. As a consequence, whenever the reel 56 rotates the shaft 58 revolves and the pump 60 is driven. A closed loop of pipe or tubing is connected from the output of the pump 60 back to the input. A stand pipe 62 or reservoir may be provided for insuring an adequate supply of oil.

A valve 64 is provided somewhere in the loop of the pipe. A control knob 66 is mounted on the top of the table 22 and connected to the valve 64 by a vertical rod 68. By rotating the knob 66 and adjusting the setting of the valve 64, the flow of oil can be restricted.

When the valve 64 is completely closed, the flow of oil will be completely stopped. As a consequence, the pump 60, shaft 58, and reel 56 will all be locked against any rotation. However, as the valve 64 opens and the oil is allowed to flow, the drag on the reel 56 will decrease. This has been found to be a very simple but highly effective way of controlling the tension in the wire as it is pulled from the reel.

The wire 55 for the spring travels substantially straight up from the reel 56 to a first block 70. In then travels over that block 70 and diagonally downwardly to a second block 72. It has been found desirable for the first block 70 to be suspended from the end of an arm 74 by means of a spring 76. This spring 76 is stretched somewhat as a result of the tension in the wire 55.

In the event the wire 55 momentarily sticks on the reel, etc., the spring 76 absorbs the resultant shock and maintains a substantially uniform tension in the wire 55. Also, as the wire unwinds from the reel 56, it weaves back and forth from one side to the other. The spring arrangement allows the block 70 to swing through a sufficient arc to follow the wanderings of the wire 55 and maintain a fair lead at all times.

The second block 72 is usually mounted in a rigid, fixed position upon the vertical support 30. The leading side of the block 72 is aligned with the block 70 while the trailing side is aligned with a preselected area of the tape 18 and the mandrel 14. As a consequence, the tape 18 and the wire 55 will enter onto the mandrel 14 in precisely controlled alignment and with precisely controlled tensions.

Although the mandrel 14 may be of any desired variety, in the present instance it includes a pair of elongated cylindrical rollers 80 and 82. The two rollers 80 and 82 may be substantially identical to each other. FIG-7 shows, on an enlarged scale, the details of one of the rollers. Each roller is usually formed from a solid bar or rod, for example of aluminum. The bar is an elongated cylinder having an outside diameter which is generally somewhat around one-half or somewhat less than the inside diameter of the finished duct 12.

A plurality of annular grooves 84 is formed into the roller. These grooves 84 are intended to receive the wire 55 for the spring 16. The depth of the groove 84 should be adequate to guide the wire 55. However, it should be shallow enough to cause the wire 55 to project above the roller. By way of example, the depth may be equal to approximately one-half the diameter of the wire 55. The grooves 84 are usually axially spaced along the rollers 80 and 82 at intervals corresponding to the pitch of the duct 12.

The ends of the rollers 80 and 82 are usually tapered or rounded off to allow the finished duct 12 to easily slip off the mandrel 14.

The opposite ends of the rollers 80 and 82 include cylindrical support shafts 86 and 88. If desired the roller may revolve upon the shaft. However, in the present instance both of the rollers 80 and 82 are rigidly secured to the shafts 86 and 88 whereby they rotate together.

The rollers 80 and 82 forming the mandrel 14 are both mounted on a vertical support 90 which projects upwardly from the center of the table 22. The present support 90 includes a pair of vertical plates 92 and 94 with a platform 95 on the top thereof.

The first or lower roller 80 is mounted upon a pair of bearings 96 and 98 in the support structure 90. More particularly, as best seen in FIG. 2 the shaft 86 extends through the two plates 92 and 94 with bearings 96 and 98 being secured in each plate. The axis of the shaft 86 and the roller 80 are substantially horizontal. The end of the shaft 86 extends slightly beyond the rear bearing 98 and has a drive pulley 100 thereon.

This pulley 100 is coupled, by means of a V-belt 102, to an output pulley 104 on a variable speed transmission 106. The transmission 106 is connected directly to a constant speed electric motor 108 by means of a coupling 110.

By manipulating the position of the control rod 112, the gear ratio of the transmission 106 may be adjusted. This in turn regulates the speed of the output shaft. As a consequence, the speed at which the roller 80 is driven and the torque applied thereto is regulated by the operator.

The second roller 82 is also mounted on a pair of bearings 114 and 116 in the support structure 90. The front bearing 114 in the front plate 92 is generally directly above the front bearing 96 for the first roller. However, since the axis of the second roller 82 is normally skew to that of the first roller 80, the rear bearing 116 is normally not directly above the other rear bearing 98. This roller 82 and its shaft 88 usually is an idler; i.e., it is not driven by the motor 108. Accordingly, the shaft 88 may terminate immediately adjacent the bearing 116. In the present instance, the bearings (and therefore the rollers) are shown as being disposed in fixed positions. This is acceptable if an essentially constant diameter duct 12 is to be produced on the machine 10. If it is desired to produce ducts with a variety of diameters, it may be preferable to make the positions of the bearings adjustable.

The guides 46, 48 and 54 and the rollers 80 and 82 are arranged such that the tape 18 is led onto the lower roller 80 substantially tangential to the bottom of the roller 80. The tape 18 also arrives at substantially right angles to the roller 80; i.e., it is wrapped in an essentially truly circumferential direction around a portion of the roller 80.

The one edge 118 of the tape 18 is normally disposed somewhere between the first two grooves 84. The opposite edge 120 of the tape 18 is disposed somewhere between another pair of grooves 84.

The width of the tape 18 is not believed to be critical and can be varied to suit the type of duct 12 being produced. By varying the width of the tape 18, the thickness of the wall 20; i.e., the number of layers or plies, may be controlled. If a two-ply duct is desired as shown in FIGS. 5 and 6, the tape 18 may extend across a pair of grooves 84. Similarly if a single ply, triple ply, quadruple ply, etc., is desired, the tape 18 may extend across one groove, three grooves, four grooves 84, etc., respectively.

After the tape 18 passes under the lower roller 80 and up its backside, it travels upwardly to the backside of the upper roller 82. The tape 18 then passes over the top of the upper roller 82 and downwardly from the front thereof to the front of the lower roller 80. The point at which the tape 18 in this second loop contacts the lower roller 80 is displaced laterally or axially from the corresponding point at which the tape 18 contacts the lower roller 80. Normally the amount of this lateral displacement is substantially equal to the pitch of the finished duct 12. This pitch is usually substantially equal to the space between the adjacent grooves 84. Accordingly, the edge 120 of the tape 18 will overlap the second groove 84 by substantially the same amount it overlapped the first groove.

As the tape 18 passes under the lower roller 80 for the second time, it will be overlapped by the oncoming tape 18 which is just reaching the roller 80. The amount of this overlap will be determined by the width of the tape 18.

The wire 55 is led over the pulley 72 along the top of the tape 18 and into the groove 84. It then travels under the lower roller 80 and along with the tape 18 ascends upwardly to the upper roller 82 where it enters the groove 84. The wire 55 then travels over the top of the upper roller 82 along with tape 18 and downwardly to the lower roller 80. At this point the wire 55 enters the next succeeding groove 84; i.e., the groove laterally displaced from the first groove.

It can be appreciated that the tape 18 and wire 55 are obliquely wrapped around the two skew rollers 80 and 82 and each successive turn of these two is displaced by the same amount as the pitch of the finished duct 12; i.e., the distance between the grooves 84.

When the tape 18, spring 16, etc., are wound upon the mandrel 14, they are all fastened together to form an integral structure. The fastening means may be of any desired variety suitable for the materials being used. Since the tape 18 is usually a plastic, a suitable cement, adhesive, solvent, etc., may be provided for bonding the overlapping turns of the tape 18 together. In the present instance a solvent is stored in a reservoir 122 mounted on top of the platform 95. A supply tube 124 extends from this reservoir 122 down to a solvent applicator 126 for feeding the solvent thereto. A valve 128 may be provided at the bottom of the reservoir 122 for turning the flow "ON" and "OFF." A second valve 130 is provided adjacent the applicator 126 for regulating or metering the volume of the flow.

The applicator extends over the top of the tape 18 to direct a small stream of solvent onto the tape 18. The solvent is usually applied to only the edge 120 of the tape 18 for bonding the overlapping portions of the tape 18 to the adjacent turns. It is desirable that none of the solvent be applied to the portion of the tape 18 which is going to directly contact the rollers 80 and 82.

It may be appreciated that as the lower roller 80 is driven by the motor 108 it will pull the tape 18 and wire 55 from the spool 32 and reel 56, respectively, and cause them to travel repeatedly around the two rollers 80 and 82. Eventually they will travel beyond the ends of the rollers. The solvent applied to the overlapping edge 120 of the tape 18 will have bonded the two layers together before they reach the ends of the rollers 80 and 82. The ends should be rounded off to facilitate the duct 12 passing off the mandrel 14.

By adjusting the drag on the guide roller 48 the tension in the tape 18 can be controlled. By adjusting the valve 64 the tension in the wire 55 can be controlled. The tension in the tape 18 and the tension in the wire 55 should be balanced against each other whereby distortions, i.e., puckering, wrinkles, etc., will not occur.

It should be appreciated the tension can be made great enough to prevent any slipping between the rollers 80 and 82 and the tape 18 or wire 55. Moreover, if the tensions are made great enough the overlapping portions of the tape 18 and wire 55 will be compressed radially against the rollers 80 and 82 and themselves with a very large force. This force can be maintained large enough to insure a complete and permanent bonding of all the components together.

In order to use the machine 10 for producing a flexible duct 12, the machine 10 is first "loaded" with a spool 32 of tape 18 and a reel 56 of wire 55.

The wire 55 is led from the reel 56 and threaded through pulleys 70 and 72. It is then led under the lower roller 80, over the upper roller 82, and back down to and around the lower roller 80.

Next the tape 18 is threaded over and under the guide rollers 46 and 48, across the guide 54, under the applicator 126, around the lower roller 80 (and wire 55 thereon), over the upper roller 82 (and the wire 55 thereon), and beneath the overlapping portions of the next loop of tape 18.

If the wire 55 is placed in the first groove 84a adjacent edge 118, all of the layers of the tape 18 will be outside of the spring 16. The resultant duct 12 will be similar to to that in FIG. 5 and the spring 16 will be exposed on the inside of the duct 12. If the wire is threaded into the second groove 84b adjacent edge 120, it will be outside of one layer and inside the other. As a result the spring 16 will be buried and out of sight as seen in FIG. 6.

Next the applicator 126 may be turned "ON" (by opening valve 128 and/or valve 130) and the motor 108 started. This will cause the tape 18 and wire 55 to be pulled onto the rollers 80 and 82 and therearound.

The overlapping edges 118 and 120 of the tape 18 will be bonded together by the ribbon of solvent applied thereto whereby a duct 12 is formed. This duct 12 will then rotate around the mandrel 14 as driven by the lower roller 80 and then travel off the end of the mandrel 14.

It should be noted that since spool 32 is free to float axially on the spindle 36 and since the fork 40 controls the position of the tape 18 as it leaves the spool 32, the guide rollers 46, 48 and 54 will always feed the tape 18 onto the lower roller 80 in a very accurately controlled alignment. Also, since the drag on the tape 18 and the drag on the wire 55 may be separately controlled, the tensions in these two components may be very precisely regulated. This insures their being properly balanced against each other. Also, the radial compression between the overlapping portions of the tape 18 and/or wire 55 may be maintained high enough to insure a complete bonding.

It should further be noted because of the skew relationship of the rollers 80 and 82 even though the tape 18 and wire 55 initially enter the roller 80 in a truly circumferential direction they are actually wrapped in a truly spiral manner. This in turn causes the formation of a truly spirally wrapped duct 12 and its progressively advancing along the mandrel 14 and off its end.

As indicated before if all of the ducts 12 to be produced on the machine 10 are to be of the same diameter, the two rollers 80 and 82 may be permanently mounted in a fixed position. However, if it is desired to produce ducts of different diameters, it is desirable to make the position of the rollers 80 and 82 adjustable relative to each other.

Normally the lower or driven roller 80 is allowed to remain in a fixed position. This avoids the necessity of in any way interfering with the drive train for the roller 80. Acordingly, the alignment of transmission 106, pulleys 100–104 and the V-belt 102 is not impaired.

The pair of upper bearings 114 and 116 may be mounted on a slide which travels up and down the plates 92 and 94. The slide may be raised and lowered by a suitable threaded hand crank, etc. By raising and lowering the rollers 80 and 82, the distance around their exterior will be varied. This in turn varies the inside circumference of the finished duct.

It should be noted that the two rollers 80 and 82 are substantially cylindrical and their axes are skew. This means the distance completely around their exterior is not precisely constant, i.e., the circumference varies with the axial position. With the arrangement shown the distance around the centers will be slightly less than the distance around the two ends.

The variation in this distance is normally relatively small and with the elastic materials normally employed this variation is immaterial. Moreover, if desired the variation may be used to control tension, etc., in the duct. For example, if the minimum distance is at the input end, the distance around will increase as the duct travels toward the end of the mandrel. This, of course, will tend to stretch the duct circumferentially and pull any wrinkles, etc. Conversely, if the smallest distance is at the output end, the circumferential distance and tension will decrease thereby releasing the duct more readily from the mandrel.

In the event it is undesirable for the distance around the rollers to vary, the embodiment of FIG. 8 may be employed. In this embodiment a pair of rollers 80 and 82 are provided. These are mounted, driven and the tape and wire fed the same as before. However, these rollers 80' and 82' are different in that they are not truly cylindrical. The diameters at their centers are somewhat larger than at the ends. This variation (grossly exaggerated in FIG. 8 to more clearly illustrate) is selected such that the distance around the outside of the two rollers 80' and 82' is always constant.

It has been found desirable with some types of duct to mark the duct at predetermined intervals such as every foot, yard, etc. This is particularly true where the duct is made and sold in bulk in long lengths. In this event the marker 150 of FIG. 9 may be used. This marker 150 is mounted on the table 22 adjacent the mandrel 14. A gear reduction train is located in a box 152. This train is coupled to the driven roller 80 preferably by a nonslipping belt 154 (i.e., a toothed timing belt). A pen 156 is mounted on the end of an arm 158 carried on an eccentric 160. This allows the pen 156 to swing up and down. When a marking point is reached the eccentric 160 swings the pen 156 out against the duct 12 and raises it with the rotating duct 12. This leaves a marking dot. When the pen 156 has passed the duct 12 the eccentric 160 retracts it and lowers it ready for the next marking.

I claim:

1. A machine for forming a flexible duct having a strip of spirally wrapped flexible material and a spiral spring, said machine including means for storing a spool of said strip of flexible material, means for storing a reel of said spring material, a pair of grooved rollers positioned adjacent each other, the axis of said rollers being skew to each other whereby the exteriors of said rollers form a rotating mandrel surface, the diameter of at least one of said rollers varying axially thereof whereby the distance around the rotating mandrel surface is substantially constant at all axial positions thereof, first guide means for feeding said strip of flexible material from said spool and onto said rollers and around said rotating mandrel surface, second guide means for feeding said spring material from said reel and onto said rollers and around said rotating mandrel surface, and power means coupled to at least one of said rollers for driving said rollers whereby the strip and spring material are continuously drawn onto said rollers and spirally wrapped around said mandrel surface to form said duct.

2. The machine of claim 1 wherein
said first guide means is effective to control the tension of said strip and to feed it onto said mandrel surface oblique to at least one of said rollers.

3. The machine of claim 1 wherein
said means for storing said spool allows said spool to move axially thereof as the strip is being unwound from the spool, and
said first guide means is effective to guide the strip through a fixed location as it unwinds from the spool.

4. The machine of claim 1 wherein
said first guide means feeds said strip obliquely onto at least one of said rollers whereby said strip forms a series of sucessive spiral turns around said mandrel surface with the edges of the adjacent turns of said strip overlapping each other, and
means for applying a bonding material to said overlapping edges for permanently bonding them together.

5. The machine of claim 4 wherein
the bonding material requires a predetermined interval of time to permanently bond the edges together, and
said rollers are so long the time required for the duct to travel the length of the mandrel surface is at least equal to said predetermined interval.

6. The machine of claim 1 wherein
the axes of said rollers are skew.

7. A mandrel for producing a flexible duct having a spirally wrapped strip of flexible material and a spring, said mandrel including a first grooved roller having an elongated exterior surface,
a second grooved roller having an elongated exterior surface, and
means rotatably mounting said rollers adjacent each, said mounting means maintaining said rollers skew to each other whereby said elongated exterior surfaces rotate and form a continuously moving mandrel surface for rotatably supporting said duct and advancing it axially along the mandrel,
the diameters of said rollers varying axially of the rollers whereby the circumference of said mandrel is uniform over its entire length.

References Cited

UNITED STATES PATENTS

| | | | |
|---|---|---|---|
| 2,759,521 | 8/1956 | Hall et al. | 156—429 |
| 3,173,822 | 3/1965 | Rigaut | 156—429 |
| 2,762,419 | 9/1956 | Prewitt | 156—429 X |
| 3,438,831 | 4/1969 | Otstot | 156—432 X |
| 3,219,738 | 11/1965 | Olson | 156—143 X |
| 2,486,387 | 11/1949 | Bringolf | 156—195 X |
| 2,539,853 | 1/1951 | Meyers et al. | 156—428 X |

ALFRED L. LEAVITT, Primary Examiner

D. A. SIMMONS, Assistant Examiner

U.S. Cl. X.R.

156—143, 189, 192, 195, 428, 446